United States Patent
Udarbe et al.

[11] Patent Number: 5,988,279
[45] Date of Patent: Nov. 23, 1999

[54] METHOD FOR CONTROL OF FLUID LOSS AND GAS MIGRATION IN WELL CEMENTING

[75] Inventors: Rebecca G. Udarbe, Garland; Kim Hancock-Grossi, Dallas, both of Tex.

[73] Assignee: Fritz Industries, Inc., Mesquite, Tex.

[21] Appl. No.: 08/964,622

[22] Filed: Nov. 5, 1997

[51] Int. Cl.$^6$ .......................... E21B 33/138; E21B 33/14
[52] U.S. Cl. .......................... 166/293; 106/696; 106/725; 106/727; 106/823; 166/295; 524/3; 524/5
[58] Field of Search .................. 166/293, 294, 166/295; 106/696, 708, 714, 724, 725, 727, 778, 781, 790, 823; 524/3, 5

[56] References Cited

U.S. PATENT DOCUMENTS

| | | | |
|---|---|---|---|
| 3,116,264 | 12/1963 | Wahl | 166/293 X |
| 3,943,996 | 3/1976 | Guilbault et al. | 166/293 |
| 4,015,991 | 4/1977 | Persinski . | |
| 4,107,057 | 8/1978 | Dill . | |
| 4,404,111 | 9/1983 | Bi . | |
| 4,515,635 | 5/1985 | Rao . | |
| 4,555,269 | 11/1985 | Rao . | |
| 4,587,283 | 5/1986 | Hille et al. | 524/3 |
| 4,602,685 | 7/1986 | McKenzie | 166/293 |
| 4,610,306 | 9/1986 | Reese | 166/293 |
| 4,652,623 | 3/1987 | Chen | 526/287 |
| 4,676,317 | 6/1987 | Fry | 166/293 |
| 4,703,801 | 11/1987 | Fry | 166/293 |
| 4,726,906 | 2/1988 | Chen . | |
| 4,743,301 | 5/1988 | Ito et al. | 524/5 |
| 4,951,921 | 8/1990 | Stahl et al. | 166/295 X |
| 5,028,271 | 7/1991 | Huddleston | 106/720 |
| 5,116,421 | 5/1992 | Ganguli | 106/823 |
| 5,134,215 | 7/1992 | Huddleston | 527/400 |
| 5,147,964 | 9/1992 | Huddleston | 527/400 |
| 5,153,240 | 10/1992 | Stephens | 524/3 |
| 5,336,316 | 8/1994 | Dawson | 106/724 |
| 5,339,903 | 8/1994 | Eoff | 166/293 |
| 5,341,881 | 8/1994 | Rodrigues | 166/293 |
| 5,855,244 | 1/1999 | Ahmed et al. | 166/295 |

OTHER PUBLICATIONS

The Relationship of Thickening Time, Gel Strength, and Compressive Strength of Oilwell Cements, Sabins Mar. 1986, p. 10.

*Primary Examiner*—George Suchfield
*Attorney, Agent, or Firm*—Thomas R. Weaver

[57] ABSTRACT

This invention discloses a composition and a method of using the composition to cement a borehole penetrating a subsurface earth formation. The composition, the random polymerization product of two or three different vinyl-containing monomers including a vinylamide morpholine derivative, operates to reduce fluid loss from the cement slurry used to cement the borehole to the subsurface formation.

8 Claims, No Drawings

METHOD FOR CONTROL OF FLUID LOSS AND GAS MIGRATION IN WELL CEMENTING

BACKGROUND OF THE INVENTION

1. Field of the Invention

This invention relates to the cementing of wells which penetrate subterranean formations. The invention further relates to a composition for and a method of cementing a well with a slurry of hydraulic cement in water whereby loss of fluid from the slurry is reduced and movement of gas into the slurry from a subterranean formation adjacent the slurry is substantially reduced if not eliminated.

2. Related Art and Problem Solved

It is known in the art of well cementing, to position a sheath of hardened cement in the annular space between a well pipe, such as a casing, and the walls of a wellbore which penetrates a subterranean formation wherein the purpose of the sheath is to support the casing in the wellbore and to prevent the undesirable movement of formation fluids, i.e., oil, gas and water, within the annular space between subsurface formations and/or to the surface of the earth. It is known that the process of positioning the sheath is referred to as primary cementing.

Thus, according to the known process of primary cementing, a slurry of hydraulic cement in water is formed, the slurry is pumped down the casing and circulated up from the bottom thereof in the annulus to a desired location therein and then permitted to remain undisturbed—static— in the annulus for a time sufficient to enable the hydraulic cement to react with the water in the slurry, i.e., to set, to thereby position the sheath of hardened cement.

The slurry of cement, when first placed in the annulus, acts as a true liquid and wills therefore, transmit hydrostatic pressure. Thus, sufficient hydrostatic pressure is exerted, as a feature of the process of primary cementing, to balance the pressure of any gas in the formation to prevent the movement of gas from the formation into and through the slurry in the annulus. Movement of gas from a formation into and through a cement slurry in an annulus is referred to in the art as gas migration.

Gas migration can result in movement of gas in the slurry from one formation to another or even to the surface of the earth. Such movement can cause loss of control of pressure and result in a blowout. As mentioned previously, gas migration can be controlled if sufficient pressure can be transmitted through the slurry. However, loss of control can be experienced and gas migration can occur if the slurry does not possess the properties of a true liquid and is unable to transmit hydrostatic pressure.

Before a slurry of hydraulic cement sets into a hardened mass having compressive strength, events take place which cause the slurry to lose the ability to transmit hydrostatic pressure. One of the events is the loss of liquid from the slurry to the formation. Another event is the development of static gel strength in the slurry.

It seems clear that the loss of water from a slurry of cement will diminish the ability of the slurry to transmit hydrostatic pressure. The ability to control water loss becomes more difficult as the temperature increases, especially at temperatures greater than about 200 degrees F. It is thus an object of this invention to provide a composition for and a method of reducing liquid loss from a slurry of hydraulic cement at temperatures greater than about 200 degrees F.

When a slurry of hydraulic cement becomes static it begins to develop a property known in the art as static gel strength, or simply gel strength. (In this regard, note Sabins, et al., "The Relationship of Thickening Time, Gel Strength, and Compressive Strength of Oilwell Cements," SPE Production Engineering, March 1986, pages 143–152.)

Gel strength is not compressive strength. Thus, as a slurry of hydraulic cement sets into a hardened mass having compressive strength, it is believed that the hardening process experiences phases which are relevant to the phenomenon of gas migration. (See Eoff et al, U.S. Pat. No. 5,339,903.) In the first phase of the process, it is believed that the slurry contains sufficient liquid to enable the slurry to possess the characteristics of a true liquid. Accordingly, during the first phase, the slurry can transmit hydrostatic pressure and gas migration can be prevented by applying sufficient hydrostatic pressure which is transmitted against a gas-containing formation to thereby prevent the movement of gas from the formation into the slurry.

During the first phase of the process, some of the liquid in the slurry is lost—this is referred to as fluid loss—and the slurry begins to stiffen due to the formation of a gel structure. During this first phase, even though fluid loss and gel formation do occur, it is believed that the setting cement retains the ability to transmit hydrostatic pressure. Accordingly, gas migration can be prevented so long as the slurry exhibits the properties of a true liquid and so long as the stiffness of the gel structure—referred to as gel strength—is less than or equal to a certain value which has been referred to in the art as the first critical value. The first critical value is believed to be about 100 $lb_F$/100 sq.ft.

In the second phase of the hardening process, the gel strength of the slurry exceeds the first critical value and continues to increase; fluid loss may continue, although at a rate much lower than that experienced in the first phase. During the second phase, it is believed that the setting cement loses the ability to transmit full hydrostatic pressure. Accordingly, gas migration may not be prevented during the second phase because the gel strength of the slurry may be too high to permit full transmission of hydrostatic pressure, but too low to resist pressure exerted by gas in the formation against the slurry. This condition exists until the gel strength increases to a value which has been referred to in the art as the second critical value, which is high enough to resist pressure exerted by gas in the formation against the slurry. The second critical value is believed to be about 500 $lb_F$/100 sq.ft.

In the third phase of the hardening process, gas migration is prevented because gel strength is equal to or greater than the second critical value. The cement continues to harden until it attains a compressive strength deemed sufficient to enable further operations in the wellbore.

It is noted that Sabins, et al., mentioned above, provide a discussion and a description of a method and apparatus to experimentally determine gel strength value.

In view of the above, in order to minimize gas migration, it is desirable that maximum fluid loss, if any, should occur prior to the beginning of the second phase of the cement hardening process; that the first phase should continue over an extended period of time; and that the second phase should be completed in a short period of time.

The time required for a slurry of hydraulic cement to attain the first critical value from the time the slurry becomes static has been defined in the art as "Zero Gel Time," and the time required for a slurry to attain the second critical value from the time it attains the first critical value has been defined in the art as "Transition Time."

It is thus another object of this invention to provide a composition for and a method of extending Zero Gel Time of a slurry for a time sufficient to enable the rate of fluid loss from the slurry to decline to a substantially constant value and to accelerate Transition Time.

It is a further object of this invention to provide a method of cementing a wellbore which penetrates a gas-containing subterranean formation whereby gas migration at temperatures up to 400 degrees F. and particularly above 200 degrees F. is reduced if not eliminated.

A cement having an extended Zero Gel Time, which is a stated object of this invention, is referred to herein as a "low gel strength cement." It is believed, in addition to the use in primary cementing as described above, that a low gel strength cement finds particular use in remedial cementing practices such as in placement thereof by coil tubing and dump bailer applications.

SUMMARY OF THE INVENTION

It has now been discovered that a polymer composition comprising the random polymerization product of a vinylamide morpholine derivative with at least one and, preferably, two other different vinyl-containing monomers selected from monomers within the group consisting of a vinylamide derivative, an N-vinyl,2-ketoheterocyclic derivative and a vinylacid derivative, when added to a slurry of hydraulic cement made with either fresh or salt water, is effective to reduce fluid loss from and modify the gel strength of the slurry. It is believed that the fluid loss control and gel strength modification properties of the compound are effective at temperatures of up to about 400 degrees F., particularly at temperatures in the range of from about 80 to about 200 degrees F. and more particularly in the range of from about 80 to about 180 degrees F. The fluid loss control and gel strength modification properties of the polymer composition render the compound very useful in a method of cementing a wellbore which penetrates a subterranean gas-containing formation whereby migration of gas from the formation into and through the slurry in the wellbore is reduced.

The vinylamide morpholine derivatives useful herein are selected from compounds represented by the general formula

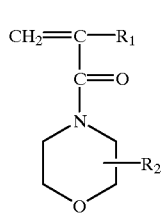
(1)

The vinylamide derivatives useful herein are selected from compounds represented by the general formula

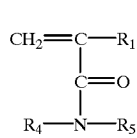
(2)

The N-vinyl,2-ketoheterocyclic derivatives useful herein are selected from compounds represented by the general formula

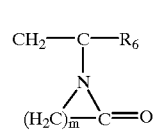
(3)

The vinylacid derivatives useful herein are selected from compounds represented by the general formula

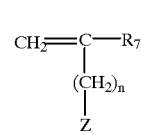
(4)

The polymer composition of this invention is sometimes referred to herein as the gel strength modifier/fluid loss additive of this invention. Thus, in one aspect, the polymer composition of this invention is a copolymer made by reacting a monomer selected from compounds within the scope of formula (1), the vinylamide morpholine derivative, with a monomer selected from compounds within the scope of formula (2), the vinylamide derivative, or with a monomer selected from compounds within the scope of formula (3), the N-vinyl,2-ketoheterocyclic derivative or with a monomer selected from compounds within the scope of formula (4), the vinylacid derivative.

In another aspect, the polymer composition is a terpolymer made by reacting a vinylamide morpholine derivative, formula (1), with two different monomers selected from compounds within the scope of formulas (2), (3) and (4) wherein each of the two different monomer reactants is selected from a different vinyl-containing structure as defined in formulas (2), (3) and (4), above. For example, if one of the two different monomers is selected from compounds within the scope of formula (2), then the second monomer must be selected from compounds within the scope of either formula (3) or formula (4).

In a preferred embodiment, the polymer composition is a copolymer made by reacting a monomer within the scope of formula (1) with a monomer within the scope of formula (2).

In another preferred embodiment the polymer composition is a terpolymer made by reacting a monomer within the scope of formula (1) with a monomer within the scope of formula (2) and with a monomer within the scope of formula (4).

The polymer composition of this invention and the method of preparation thereof should be distinguished from the method of making graft polymers and the resulting product. In this regard grafting polymers on a natural product backbone is a known process. An example of the process is found in Fry, et al., U.S. Pat. No. 4,703,801 and Fry, et al. U.S. Pat. No. 4,676,317 each of which disclose a natural product backbone, lignin or lignite, having grafted thereto polymers including homopolymers and copolymers of 2-acrylamido-2-methylpropanesulfonic acid and N,N-dimethylacrylamide. The Fry, et al., polymer graft is disclosed to be useful in a cementing composition as a fluid loss additive. Fry, et al., do not mention modification of slurry gel properties, zero gel time, transition time or gas migration.

Eoff et al., U.S. Pat. No. 5,339,903, disclose grafting polymer groups to tannin, a natural product backbone, wherein the polymer groups consist of at least two, and preferably three, vinylamide derivatives. Eoff et al. do mention modification of slurry gel properties, zero gel time, transition time and gas migration.

Another example of the use of a polymer grafted natural product backbone in a well cementing composition is provided in Huddleston, et al., U.S. Pat. No. 5,134,215 and Huddleston, et al., U.S. Pat. No. 5,147,964. Huddleston, et al., each disclose a wattle tannin backbone grafted with 2-acrylamido-2-methylpropanesulfonic acid or with 2-acrylamido-2-methylpropanesulfonic acid and acrylamide. Huddleston, et al., disclose their polymer grafted tannin to be useful as a fluid loss additive in a cementing composition, but they do not mention modification of slurry gel properties, zero gel time, transition time or gas migration.

DESCRIPTION OF THE PREFERRED EMBODIMENTS

By this invention, there is provided a polymer composition, a hydraulic cement slurry composition containing the polymer composition and a method of using the hydraulic cement slurry composition to cement a pipe, such as a casing, in a wellbore whereby fluid loss is reduced and gas migration in the cement slurry is eliminated or at least substantially reduced. Accordingly, when a pipe is cemented in a wellbore which penetrates a gas-containing subterranean formation, the composition of this invention, when placed by conventional steps adjacent the gas-containing formation, exhibits low fluid loss and acts to eliminate, or to at least substantially reduce, gas migration, i.e., the movement of gas from the formation into and through the cement slurry.

As mentioned, gas migration is a problem to be avoided because it leads to communication by way of the well annulus between formations and/or to the surface and is thus a source of surface and subsurface blowouts.

Gas moving in a hardening cement slurry can create permanent channels in the set cement. The gas channels must be filled with cement in a separate remedial cementing technique called squeezing in order to prevent the communication mentioned above.

Gas migration is caused by the inability of the cement slurry placed in the zone adjacent the gas-containing formation to resist the pressure of the gas in the formation. Accordingly, the gas moves from the formation into and through the slurry.

The hydraulic cement slurry composition of this invention is formulated to provide a Zero Gel Time of greater than about one hour and a Transition Time of less than about one hour, whereby the time in which the hardening cement slurry can transmit hydrostatic pressure is maximized, and the time in which gas migration can occur is minimized. Furthermore, fluid loss from the hydraulic cement slurry composition of this invention is less than about 100 cc/30 minutes and maximum fluid loss is believed to occur prior to the attainment of Zero Gel Time.

Cement slurries, which do not contain gel strength modifiers, such as those disclosed and claimed herein, ordinarily have Zero Gel Times of much less than one hour. This means that the fluid loss rate from such a slurry will still be relatively high after the slurry has reached the second critical value. This high fluid loss rate combined with the inability of the gelled slurry to transmit hydrostatic pressure greatly increases the probability that gas migration will occur.

The hydraulic cement slurry composition of this invention is comprised of hydraulic cement, water, present in an amount in the range of from about 35 to about 60 percent water by weight of dry cement, and the gel strength modifier/fluid loss additive of this invention, present in an amount in the range of from about 0.1 to about 1.5, preferably 0.3 to about 1.0 and still more preferably from about 0.5 to about 0.8 percent additive by weight of dry cement. Mix water concentrations greater than those mentioned can be employed in the presence of extenders and/or ultra fine and slag cements.

The slurry, in addition to the above ingredients, also preferably includes a high temperature set time retarder such as sodium or calcium lignosulfonate or organic acids, such as citric, tartaric or gluconic acid, or mixtures of such acids and lignosulfonates present in an amount in the range of from about 0.5 to about 2.0 percent retarder by weight of dry cement. Furthermore, a high temperature strength regression aid such as silicon dioxide, can be present in the slurry in an amount in the range of from about 0 to about 40 percent by weight of dry cement. If desired a weighting agent, such as hematite, may be included in the slurry in an amount in the range of from about 10 percent to about 60 percent by weight of dry cement.

As previously mentioned, the additive of this invention is a polymer composition comprising the random polymerization product of a vinylamide morpholine derivative with at least one and, preferably, two other different vinyl-containing monomers selected from monomers within the group consisting of a vinylamide derivative, an N-vinyl,2-ketoheterocyclic derivative and a vinylacid derivative. Accordingly, the polymer composition can be a random copolymer or a random terpolymer. The copolymer is made by reacting a monomer selected from compounds within the scope of formula (1), the vinylamide morpholine derivative, with a monomer selected from compounds within the scope of formula (2), the vinylamide derivative, or with a monomer selected from compounds within the scope of formula (3), the N-vinyl,2-ketoheterocyclic derivative or with a monomer selected from compounds within the scope of formula (4), the vinylacid derivative. The terpolymer is made by reacting a vinylamide morpholine derivative, formula (1), with two different monomers selected from compounds within the scope of formulas (2), (3) and (4) wherein each of the mentioned two different monomer reactants is selected from a different vinyl-containing structure as defined in formulas (2), (3) and (4), above.

It is noted that the polymer composition of this invention does not include a polymer made from all four of the defined structures.

Thus, the polymer composition of this invention consists of: copolymers made from monomers within the scope of formulas (1) and (2), formulas (1) and (3) and formulas (1) and (4); and terpolymers made from monomers within the scope of formulas (1), (2) and (3), formulas (1), (2) and (4) and formulas (1), (3) and (4).

The vinylamide morpholine derivatives useful herein are selected from compounds represented by the general formula

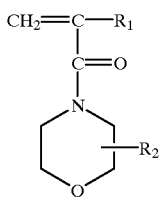

(1)

wherein $R_1$ is —H or —$CH_3$ and $R_2$ is —$CH_3$ or —$CH_2CH_3$ and can be positioned on any one of the four carbons in the morpholine ring.

The vinylamide derivatives useful herein are selected from compounds represented by the general formulas

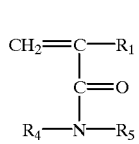

(2)

wherein $R_3$ is —H or —$CH_3$; $R_5$ is —H, —$CH_3$ or —$CH_2CH_3$; and $R_4$ is —H, —$CH_3$, —$CH_2CH_3$, —$CH(CH_3)_2$, —$C(CH_3)_3$ or —$C(CH_3)_2CH_2SO_3X$ wherein X is —H, —Na, —$NH_4$ or —Ca½.

The N-vinyl,2-ketoheterocyclic derivatives useful herein are selected from compounds represented by the general formula

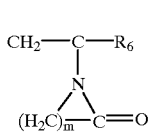

(3)

wherein $R_6$ is —H or —$CH_3$; and m has a value in the range of 3 to 6.

The vinylacid derivatives useful herein are selected from compounds represented by the general formula

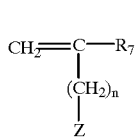

(4)

wherein $R_7$ is —H or —$CH_3$; Z is —$PO_3Y_2$, —$SO_3Y$ or —$CO_2Y$ wherein Y is —H, —Na or —Ca½ and n has a value in the range of from about 0 to about 3.

In one preferred embodiment, the polymer composition of this invention consists essentially of the copolymerization product of the vinylamide morpholine derivative and the vinylamide derivative, wherein $R_4$ is a propanesulfonic acid group, i.e., $R_4$=—$C(CH_3)_2CH_2SO_3H$, and $R_1$, $R_2$, and $R_3$ and $R_4$ are each hydrogen.

In another preferred embodiment, the polymer composition of this invention consists essentially of the terpolymerization product of the vinylamide morpholine derivative, the vinylamide derivative and the vinylacid derivative, wherein Z is a phosphonic acid group, i.e., n=0 and Z=—$PO_3H_2$, or an acrylic acid group, i.e., n=1 and Z=—$CO_2H$, $R_4$ is a propanesulfonic acid group, i.e., $R_4$=—$C(CH_3)_2CH_2SO_3H$, and $R_1$, $R_2$, $R_3$, $R_5$ and $R_7$ are each hydrogen.

In still another preferred embodiment, the polymer composition of this invention consists essentially of the terpolymerization product of the vinylamide morpholine derivative, the N-vinyl,2-ketoheterocylic derivative and the vinylacid derivative, wherein m is 3 or 5, Z is a phosphonic acid group, i.e., n=0 and Z=—$PO_3H_2$, or an acrylic acid group, i.e., n=1 and Z=—$CO_2H$, and $R_1$, $R_2$, $R_6$ and $R_7$ are each hydrogen.

The mole ratio of the vinylamide derivative to the vinylamide morpholine derivative in the polymer composition is an amount in the range of from about 0 to about 4.5 moles of the vinylamide derivative per mole of the vinylamide morpholine derivative. This range recognizes the situation involving the complete absence of the vinylamide derivative.

Likewise, the mole ratio of the N-vinyl,2-ketoheterocylic derivative to the vinylamide morpholine derivative in the polymer composition is an amount in the range of from about 0 to about 4.5 moles of the N-vinyl,2-ketoheterocylic derivative per mole of the vinylamide morpholine derivative. This range recognizes the situation involving the complete absence of the N-vinyl,2-ketoheterocylic derivative.

It was previously mentioned that the terpolymer can include both the vinylamide derivative and the N-vinyl,2-ketoheterocylic derivative. In this situation the sum of the molar concentrations of the vinylamide derivative and the N-vinyl,2-ketoheterocylic derivative cannot exceed the mole ratio of 4.5 moles of the combination per mole of the vinylamide morpholine derivative. In view of the above, it is to be understood that if the molar concentration of either the vinylamide derivative or the N-vinyl,2-ketoheterocylic derivative in the polymer composition is zero, then the concentration of the other can be an amount up to and including the 4.5 to 1 mole ratio described above. It is to be further understood that if the molar concentrations of each of the vinylamide derivative and the N-vinyl,2-ketoheterocylic derivative in the polymer composition is greater than zero, then the sum of the mole ratios of each with respect to the vinylamide morpholine derivative cannot exceed 4.5.

Whenever the vinylamide derivative or the N-vinyl,2-ketoheterocylic derivative is present in the polymer composition it is believed that an effective concentration of either one can be as low as about 0.5 moles per mole of the vinylamide morpholine derivative. However, subject to the 4.5 mole ratio limit mentioned above, the concentration of either one is preferably in the range of from about 1.5 to about 3.0 and most preferably from about 2 to about 2.5 moles of the vinylamide derivative and/or the N-vinyl,2-ketoheterocylic derivative per mole of the vinylamide morpholine derivative.

The mole ratio of the vinylacid derivative to the vinylamide morpholine derivative in the polymer composition is an amount in the range of from about 0 to about 4.5 moles of the vinylacid derivative per mole of the vinylamide morpholine derivative. This range recognizes the situation involving the complete absence of the vinylacid derivative up to the maximum concentration of the vinylacid derivative when the polymer composition is a copolymer including only it and the vinylamide morpholine derivative. However, when the polymer composition is a terpolymer including the vinylacid derivative, then the maximum concentration of the vinylacid derivative is 0.55 and, preferably, in the range of from about 0.005 to about 0.45 and most preferably from about 0.01 to about 0.35 moles of the vinylacid derivative per mole of the vinylamide morpholine derivative.

It was mentioned above that the polymer composition of this invention can control fluid loss from and modify the gel strength of a slurry of hydraulic cement in both fresh water and salt water. In this regard, it has been discovered that the operability of the polymer composition of this invention to reduce fluid loss from and modify gel strength of fresh water and salt water cement slurries is, to a great extent, a function of the content of the compound. Thus, if a fresh water slurry is to be treated, then the polymer composition of this invention to be utilized is preferably made by polymerizing the vinylamide morpholine derivative with either the vinylamide derivative or the N-vinyl,2-ketoheterocylic derivative or mixtures thereof employing the mole ratios disclosed above. However, if a salt water slurry is to be treated, then the polymer composition to be utilized is preferably made by terpolymerizing the vinylamide morpholine derivative with either the vinylamide derivative or the N-vinyl,2-ketoheterocylic derivative and the vinylacid derivative employing the mole ratios disclosed above.

It is noted that the polymer composition of this invention when made with the vinylacid derivative is effective to reduce fluid loss and modify gel strength in both fresh and salt water slurries. However, it has been observed that the inclusion of the vinylacid derivative in the polymerization recipe produces a polymer composition which, in addition to the fluid loss control and gel strength modification properties, also acts to retard the set time of a cement slurry. Accordingly, when fresh water slurries are to be treated, it is preferred that the polymer composition employed should not include the vinylacid derivative in the polymerization recipe.

The upper limit of the mole ratio of the vinylacid derivative to the vinylamide morpholine derivative in the recipe for making the terpolymer aspect of the polymer composition was disclosed to be about 0.55 moles of the vinylacid derivative per mole of the vinylamide morpholine derivative. At this limit, the fluid loss effect on salt water slurries remains quite satisfactory, but set retardation may be excessive from an operational point of view.

The preferred vinylamide morpholine derivative is acryloylmorpholine, the preferred vinylamide derivative is 2-acrylamido-2-methylpropanesulfonic acid, the preferred N-vinyl,2-ketoheterocylic derivative is N-vinyl pyrrolidone and the preferred vinylacid derivative is vinylphosphonic acid.

Some specific compounds within the scope of formula (1) believed to be useful herein include acryloylmorpholine and methacryloylmorpholine.

Some specific compounds within the scope of formula (2) believed to be useful herein include 2-acrylamido-2-methylpropanesulfonic acid, acrylamide, methacrylamide, N-methylacrylamide, N-i-propylacrylamide, N-i-propylmethacrylamide, N-t-butylacrylamide, N-t-butylmethacrylamide, N,N-dimethylacrylamide and N,N-dimethylmethacrylamide.

Some specific compounds within the scope of formula (3) believed to be useful herein include N-vinyl pyrrolidone, and N-vinyl caprolactam.

Some specific compounds within the scope of formula (4) believed to be useful herein include vinyl phosphonic acid, acrylic acid and vinylsulfonic acid.

The polymer composition of this invention is water soluble, and can be employed in the liquid or solid (dry) state and in the acidic or base neutralized form.

The polymer composition of this invention is prepared by forming an aqueous solution of the disclosed vinyl derivatives and causing the derivatives to react in the presence of an effective amount of a suitable water soluble initiator at atmospheric pressure and at a temperature in the range of from about 40 to about 50 degrees Celsius. The total weight of the disclosed vinyl derivatives, in the combinations and mole ratios disclosed above, is present in the mentioned aqueous solution in an amount in the range of from about 5 to about 20, preferably 7 to 15 and still more preferably from about 9 to about 13 percent by total weight of solution.

Accordingly, to obtain the polymer composition of this invention having a molecular weight in the desired range the mole ratio of the total number of moles of vinyl derivatives in the reaction mass per mole of initiator is believed to be an amount in the range of from about 125 to about 135 wherein the reaction is conducted at the temperatures and pressure set out above.

Addition of initiator to the reaction mass is conveniently effected in water solution. For example, in one preferred embodiment featuring acryloylmorpholine, 2-acrylamido-2-methylpropanesulfonic acid and vinylphosphonic acid as the reactants, the initiator, sodium persulfate, is added to the reaction mass in a 14.5 percent by weight aqueous solution. As such, when the combined weights of the reactants, initiator and solution water are considered, sodium persulfate is present in an amount in the range of from about 0.05 to about 0.2, preferably from about 0.075 to about 0.15 and more preferably about 0.09 to about 0.12 percent by weight of the entire reaction mass.

The preferred initiator is sodium persulfate and functional equivalents thereof as disclosed in U.S. Pat. No. 4,726,906.

The term "cement" as used herein is intended to include those compounds of a cementitious nature which are described as hydraulic cements. Such compounds include, for example, Portland Cement in general and particularly Portland Cements of API Classes G and H, although other API classes can be utilized, as well as pozzolan cements, gypsum cements, high alumina content cements, slag cements, high gel (high clay content) cements, silicate containing cements, ultrafine cements and high alkalinity cements. Portland cements and, particularly, cement of API Classes G and H are preferred.

The aqueous fluid utilized in the cement composition can be water from any source provided that it does not contain an excess of any compounds that affect the stability of the cement composition of the present invention. The aqueous fluid can contain various salts such as sodium chloride, potassium chloride, calcium chloride and the like.

Other types of well known and conventional additives also can be incorporated into the cement composition to modify the properties of the composition. Such additives include additional fluid loss additives, viscosifiers, retarders, accelerators, dispersants, weight-adjusting materials or fillers and the like.

Additional fluid loss additives which may be incorporated into the cement composition of the present invention include cellulose derivatives such as carboxymethylhydroxyethyl cellulose, hydroxyethyl cellulose, modified polysaccharides, polyacrylamides, polyaromatic sulfonates, guar gum derivatives, mixtures of such compounds and the like. Numerous other compounds which may be utilized as additional fluid loss additives are well known by those skilled in cementing technology.

A retarder may be used in the cementing composition when the bottom hole circulating temperature exceeds 100 degrees F. Examples of retarders which can be used herein include lignosulfonates, such as calcium lignosulfonate and sodium lignosulfonate, organic acids, such as citric acid, tartaric acid and gluconic acid and mixtures thereof. The amount of retarder required will vary according to the bottom hole circulating temperatures and variation in the makeup of the cement itself.

The proper amount of retarder required in any particular case should be determined by running a "thickening time" test for the particular concentration of retarder and cement composition being used. Such tests should be run according to the procedures set forth in API SPEC 10 using a device called a consistometer. Generally speaking, "thickening time" is defined in API SPEC 10 as the elapsed time from the time pumping begins until the cement reaches from about 70 to 100 units of consistency, referred to as Bearden units of consistency. Bearden units of consistency obtained on a pressurized consistometer are referred to as Bc units. Bearden units of consistency obtained on an atmospheric pressure consistometer are referred to as ABc units. In most applications the amount of retarder, if any required, will not exceed more than about 5.0 percent by weight of the dry cement.

Dispersing agents can be utilized to facilitate using lower quantities of water and to promote higher set cement strength. Friction reducers which promote freer movement of the unset composition, and allow ease of pumping through the annulus, if present, can be incorporated in the slurry in amounts up to about several percent by weight of dry cement. Some dual function additives, such as lignosulfonates which function both as a dispersant and also as a set time retarder, can be incorporated in the slurry where their use would be advantageous for certain cementing situations.

Accelerators, such as the soluble inorganic salts in addition to calcium chloride, can be utilized in amounts up to about 8 percent by weight of dry cement.

The cement composition also may include in particular applications, foaming agents or defoaming agents which comprise various anionic, cationic, nonionic and other surface active compounds. The amount of such surface active agents added to the cement composition will typically be in the range of from about 0.1 to about 3 percent by weight of dry cement. Generally, the selection of such additives will be within the skill of those knowledgeable in the art of well cementing.

Of the various types of fine aggregate which can be used, fly ash, silica flour, fine sand, diatomacious earth, lightweight aggregate and hollow spheres can be cited as typical. The use of these materials is well understood in the art, and so long as they are compatible with the compositions of the invention, they can be employed over wide ranges of concentrations.

EXAMPLES

The following examples are provided to illustrate some benefits of the composition and method of the present invention and not by way of limitation thereof.

Example 1

Polymer compositions of this invention were made employing the ingredients in the quantities set out in Table 1, below. The reactions were conducted at atmospheric pressure and at the initial reaction temperatures in the range of from 111 to 116 degrees Fahrenheit as indicated. The procedure employed to make the polymer compositions is as follows.

About 70% of the indicated quantity of D.I. Water is placed in a reaction vessel of suitable size which is equipped with a recirculating pump and associated tubing, a mechanical stirrer, a nitrogen sparge tube, an addition funnel, a temperature indicating means and a means for heating the vessel and the contents thereof. The mixer is activated to stir at 130 rpm and the indicated quantities of monomers are slowly added in sequence with continuous mixing until all monomers all completely dissolved. After all monomers are added the balance of water is added with continuous mixing. The solution is then sparged with nitrogen at 22 liters per minute for a total of 30 minutes to exclude air (oxygen) from the reaction.

Thereafter, the nitrogen sparge rate is changed to 10 liters per minute, the stirring rate is changed to 110 rpm, the entire indicated quantity of initiator in water solution is rapidly added and the temperature of the reaction mass is monitored until it appears to stabilize, which is an indication of the completion of the reaction.

Thereafter, the reaction mass is recirculated until the temperature of the mass fully stabilizes. Then, recirculation, mixing and sparging is terminated, the temperature of the mass is adjusted to a value of about 140 degrees Fahrenheit and the mass is maintained at that temperature in the closed reaction vessel for at least about 3 hours until the viscosity of the reaction product attains a value in the range of from about 5000 to about 11,000 centipoises.

TABLE 1

PREPARATION OF POLYMER COMPOSITION OF THIS INVENTION

|  |  | POLYMER #1 grams | POLYMER #2 grams | POLYMER #3 grams | POLYMER #4 grams |
|---|---|---|---|---|---|
| ACMO | (monomer) | 1406.129 | 18.11 | 78.78 | 12.05 |
| AMPS | (monomer) | 4581.259 | 59.15 | 256.75 | 37.73 |
| VPA | (monomer) | 0.0 | 0.0 | 1.44 | 0.00 |
| AA | (monomer) | 0.0 | 0.0 | 0.0 | 1.54 |
| DI WATER |  | 52162.85 | 671.65 | 2911.25 | 445.15 |
| Sub Totals |  | 58150.238 | 748.91 | 3248.22 | 496.47 |
| SP | (initiator) | 59.00 | 0.77 | 3.32 | 0.51 |
| DI WATER |  | 344.7 | 4.54 | 19.58 | 3.01 |
| Sub Totals |  | 403.7 | 5.31 | 22.9 | 3.52 |
| Total |  | 58553.938 | 754.22 | 3271.12 | 499.99 |

TABLE 1-continued

|  | ACMO/AMPS | ACMO/AMPS | ACMO/AMPS/VPA | ACMO/AMPS/AA |
|---|---|---|---|---|
| | | MOLE RATIOS | | |
| MONOMERS | 1/2.219 | 1/2.225 | 1/2.22/0.024 | 1/2.133/0.25 |
| SP | 129.49 | 127.93 | 129.83 | 134.833 |
| | | WEIGHT PERCENTS | | |
| SP (solution) | 14.615 | 14.501 | 14.498 | 14.489 |
| SP (overall) | 0.101 | 0.102 | 0.101 | 0.102 |
| ACTIVE | 10.326 | 10.345 | 10.403 | 10.366 |
| | | INITIAL REACTION TEMPERATURE | | |
| degrees F | 111 | 116 | 116 | 115 |

Note:
1. ACMO is acryloylmorpholine.
2. AMPS is 2-acrylamido-2-methylpropane sulfonic acid.
3. VPA is vinyl phosphonic acid.
4. AA is acrylic acid.
5. SP is sodium persulfate. The indicated mole ratio of SP is the sum of the molar quantities of the monomer reactants divided by the number of moles of SP. The indicated weight percent of SP (solution) is the concentration of SP in the solution added to the reaction. The indicated weight percent of SP (overall) is the concentration of SP in the entire reaction mass.
6. D.I. WATER is deionized water.
7. The reaction mass at this point is a liquid and has an acid pH. It can be employed as an additive for cement to control fluid loss and modify cement gel strength in accordance with the method of this invention.
8. The method of preparation of the additive of this invention, as shown in this Example 1, produces a random arrangement of polymers referred to as the polymer composition of this invention.
9. The weight percent ACTIVE is the total weight of monomers and initiator as a percent of the total weight of the reaction mass.

Example 2

Polymer number 1 produced as described in Example 1, above, was further treated by converting it from the liquid acid form to the dry salt form by base neutralization. Accordingly, polymer number 1 a viscous acidic liquid, was contacted with an aqueous alkaline solution, a 30 weight percent aqueous solution of calcium hydroxide, an example of which is commercially available as Mississippi Lime. The pH of the solution was adjusted to a value in the range of from about 7 to 8. Thereafter, a small quantity of silicon solution, a release agent, was added to the neutralized solution which was then placed in a drum dryer rotating at 4 revolutions per minute and operating at about 300 degrees Fahrenheit. The material was maintained in the dryer under the mentioned conditions for a time sufficient to produce a dried product which was then reduced to a fine powder by milling. The milled product was then used in accordance with the method of this invention.

Example 3

Cement slurries were prepared and tested for fluid loss, consistency and rheological properties in accordance with the provisions of API SPEC 10. Polymer number 1, shown in Table 1, above, after first being neutralized, dried and milled in accordance with Example 2, was employed in the slurries referred to in Tables 2A–2C. Polymer numbers 2, 3 and 4, shown in Table 1, unless otherwise indicated, were employed as prepared in Example 1, in the slurries referred to made in Tables 3, 4 and 5, respectively.

The quantities of "Polymer," mix water, sand and retarder, referred to in Tables 2–5, below, are expressed as percent by weight of dry API CLASS H cement unless otherwise noted.

The mix water employed, unless otherwise noted, was potable city tap water as available in Mesquite, Texas. In some runs the mix water included other ingredients which are referred to as "Additive". The quantity of "Additive" is expressed as percent by weight of mix water.

Unless otherwise noted, footnotes 3, 4, and 5 for each of Tables 2–5 is as follows: 3. Fluid Loss was determined in accordance with the provisions of API Spec 10, Appendix F. 4. Consistency was determined in accordance with the provisions of API Spec 10, Section 9. 5. Rheological properties were determined in accordance with the provisions of API Spec 10, Appendix H using a Fann Rotational Viscometer OFI Model 800 with rotor sleeve R1, bob B1 and loaded with a 1 inch spring.

TABLE 2A

| | SLURRY NUMBER 38 PERCENT MIX WATER | | | | | | | | |
|---|---|---|---|---|---|---|---|---|---|
| | 1 | 2 | 3 | 4 | 5 | 6 | 7 | $8^2$ | $9^2$ |
| Polymer, % | 0 | 0 | 0.3 | 0.4 | 0.5 | 0.5 | 0.6 | 0.6 | 0.8 |
| Additive, % | 0 | 0 | 0 | 0 | 0 | $2.0^1$ | $2.0^1$ | 0 | 0 |
| Temp deg F | 80 | 125 | 125 | 125 | 125 | 125 | 125 | 180 | 180 |
| Fluid Loss³ cc/30 mm | 1119 | 1200 | 90 | 54 | 44 | 104 | 66 | 112 | 44 |

TABLE 2A-continued

SLURRY NUMBER
38 PERCENT MIX WATER

| | 1 | 2 | 3 | 4 | 5 | 6 | 7 | 8[2] | 9[2] |
|---|---|---|---|---|---|---|---|---|---|
| Consistency[4] | | | | | | | | | |
| initial, ABc | 6 | 10 | 8 | 9 | 10 | 7 | 10 | 9 | 13 |
| @20 min, ABc | 7 | 17 | 9 | 9 | 11 | 7 | 9 | 7 | 7 |
| Rheology[5] | | | | | | | | | |
| 600 rpm | 150 | 220 | 210 | 275 | 330+ | 220 | 300+ | 137 | 209 |
| 300 rpm | 110 | 181 | 124 | 165 | 224 | 135 | 161 | 77 | 122 |
| 200 rpm | 94 | 159 | 90 | 121 | 165 | 98 | 118 | 51 | 89 |
| 100 rpm | 75 | 130 | 53 | 71 | 98 | 58 | 70 | 32 | 51 |
| 6 rpm | 23 | 21 | 7 | 9 | 12 | 8 | 10 | 4 | 5 |
| 3 rpm | 13 | 14 | 6 | 6 | 8 | 7 | 7 | 3 | 3 |

TABLE 2B

SLURRY NUMBER
44 PERCENT MIX WATER

| | 10 | 11 | 12 | 13 | 14 | 15 | 16[6] | 17[7] |
|---|---|---|---|---|---|---|---|---|
| Polymer, % | 0.3 | 0.6 | 0.4 | 0.5 | 0.6 | 0.8 | 0.6 | 0.8 |
| Additive, % | 0 | 0 | 0 | 0 | 0 | 0 | 0 | 0 |
| Temp deg F | 80 | 80 | 125 | 125 | 125 | 180 | 125 | 180 |
| Fluid Loss[3] cc/30 mm | 78 | 36 | 62 | 48 | 42 | 32 | 70 | 56 |
| Consistency[4] | | | | | | | | |
| initial, ABc | 5 | 7 | 7 | 9 | 7 | 12 | 9 | 12 |
| @20 min, ABc | 6 | 10 | 7 | 9 | 7 | 11 | 9 | 9 |
| Rheology[5] | | | | | | | | |
| 600 rpm | 129 | 272 | 144 | 215 | 230 | 212 | 236 | 254 |
| 300 rpm | 70 | 149 | 84 | 123 | 135 | 125 | 141 | 155 |
| 200 rpm | 48 | 112 | 60 | 88 | 96 | 91 | 104 | 115 |
| 100 rpm | 27 | 60 | 36 | 53 | 55 | 53 | 61 | 67 |
| 6 rpm | 4 | 6 | 5 | 7 | 7 | 6 | 7 | 7 |
| 3 rpm | 3 | 5 | 4 | 5 | 5 | 4 | 5 | 5 |

TABLE 2C

SLURRY NUMBER
MIX WATER[10]

| | 18 | 19 |
|---|---|---|
| Polymer, % | 0.6 | 0.6 |
| Additive, % | 8[8] | 2[9] |
| Temp deg F. | 80 | 80 |
| Fluid Loss[3] cc/30 mm | 42 | 72 |
| Consistency[4] | | |
| initial, ABc | 15 | 9 |
| @ 20 min, ABc | 12 | 5 |
| Rheology[5] | | |
| 600 rpm | 151 | 82 |
| 300 rpm | 91 | 46 |
| 200 rpm | 69 | 34 |
| 100 rpm | 44 | 21 |
| 6 rpm | 5 | 5 |
| 3 rpm | 3 | 2 |

Footnotes Tables 2A–2C:

[1.] Calcium chloride.

[2.] Mix water was simulated sea water, an aqueous alkaline solution consisting of 3.4% FRITZ SUPER SALT by weight of solution. FRITZ SUPER SALT is a concentrate available from Fritz Industries, Inc., of Mesquite, Texas. Dechlorinated water was employed to dilute the concentrate to prepare the mix water employed in slurries 8 and 9.

[6.] API Class G cement.

[7.] API Class G cement.

[8.] Bentonite extender.

[9.] Sodium metasilicate extender.

[10.] Slurry 18 was made using 80.3 percent mix water and slurry 19 was made using 104.6 percent mix water.

TABLE 3

SLURRY NUMBER
MIX WATER[1]

| | 20 | 21 | 22 | 23 |
|---|---|---|---|---|
| Polymer, % | 0.8 | 0.8 | 0.8 | 0.8 |
| Additive, % | 0 | 10[2] | 10[2] | 38[2] |
| Deg. F. | 180 | 180 | 180 | 180 |
| Sand | 0 | 35 | 0 | 35 |
| Retarder | 0 | 0.6[6] | 0 | 0.6[6] |
| Fluid Loss[3] cc/30 mm | 32 | 469 | 350 | 495 |
| Consistency[4] | | | | |
| initial, ABc | 12 | 15 | 15 | 20 |
| @ 20 min, ABc | 11 | 11 | 11 | 15 |
| Rheology[5] | | | | |
| 600 rpm | 212 | 330+ | 193 | 245 |
| 300 rpm | 125 | 215 | 116 | 140 |
| 200 rpm | 91 | 155 | 86 | 100 |
| 100 rpm | 53 | 92 | 51 | 58 |

TABLE 3-continued

| | SLURRY NUMBER MIX WATER[1] | | | |
|---|---|---|---|---|
| | 20 | 21 | 22 | 23 |
| 6 rpm | 6 | 15 | 6 | 10 |
| 3 rpm | 4 | 11 | 4 | 8 |

Footnotes Table 3:
[1]-Slurry 20 was made using 44 percent mix water and slurries 21, 22 and 23 were made using 41.65 percent mix water.
[2]-NaCl
[6]-Retarder was calcium lignosulfonate

TABLE 4

| | SLURRY NUMBER MIX WATER[1] | | | | | | |
|---|---|---|---|---|---|---|---|
| | 24 | 25 | 26 | 27 | 28 | 29 | 30 |
| Polymer, % | 0.8 | 1.0 | 0.8 | 1.0 | 1.0 | 1.0 | 1.0[6] |
| Additive, % | 0 | 0 | 10[2] | 10[2] | 18[2] | 38[2] | 38[2] |
| Temp deg F | 180 | 180 | 180 | 180 | 180 | 180 | 180 |
| Fluid Loss[3] cc/30 mm | 90 | 34 | 119 | 80 | 34 | 30 | 42 |
| Consistency[4] | | | | | | | |
| initial, ABc | 11 | 25 | 14 | 20 | 12 | 38 | 16 |
| @20 min, ABc | 9 | 12 | 11 | 20 | 8 | 6 | 7 |
| Rheology[5] | | | | | | | |
| 600 rpm | 277 | 330+ | 330+ | 330+ | 295 | 280 | 300+ |
| 300 rpm | 110 | 181 | 124 | 165 | 224 | 135 | 161 |
| 200 rpm | 94 | 159 | 90 | 121 | 165 | 98 | 118 |
| 100 rpm | 75 | 130 | 53 | 71 | 98 | 58 | 70 |
| 6 rpm | 23 | 21 | 7 | 9 | 12 | 8 | 10 |
| 3 rpm | 13 | 14 | 6 | 6 | 8 | 7 | 7 |

Footnotes Table 4:
[1]-Slurries 24 and 25 were made using 44 percent mix water and slurries 26, 27, 28, 29 and 30 were made using 41.65 percent mix water.
[2]-NaCl
[6]-A portion of Polymer 3 used in slurry 30 was neutralized and dried as described in Example 2, above.

TABLE 5

| | SLURRY NUMBER MIX WATER[1] | |
|---|---|---|
| | 31 | 32 |
| Polymer, % | 1.0 | 1.0 |
| Additive, % | 0 | 38[2] |
| Temp deg F. | 180 | 180 |
| Fluid Loss[3] cc/30 mm | 24 | 56 |
| Consistency[4] | | |
| initial, ABc | 11 | 20 |
| @ 20 min, ABc | 9 | 10 |
| Rheology[5] | | |
| 600 rpm | 277 | 300 |
| 300 rpm | 220 | 230 |
| 200 rpm | 160 | 170 |
| 100 rpm | 91 | 98 |
| 6 rpm | 11 | 16 |
| 3 rpm | 7 | 11 |

Footnotes Table 5:
[1]-Slurry 31 was made using 44 percent mix water and slurry 32 was made using 41.65 percent mix water.
[2]-NaCl

Example 4

Cement slurries were prepared and tested for thickening time, zero gel time, transition time and compressive strength. Polymer number 1, shown in Table 1, above, after first being neutralized, dried and milled in accordance with Example 2, was employed in the slurries referred to in Table 6.

The quantities of "Polymer," mix water and retarder, referred to in Table 6 are expressed as percent by weight of dry API CLASS H cement unless otherwise noted. The retarder employed, unless otherwise noted, was sodium lignosulfonate.

The mix water employed, unless otherwise noted, was potable city tap water as available in Houston, Tex.

Unless otherwise noted, Thickening Time was determined in accordance with the provisions of API Spec 10. Zero Gel Time and and Transition Time were determined in accordance with Sabins et al, mentioned previously, and compressive strength was measured with an Ultrasonic Cement Analyzer (UCA).

TABLE 6

| | SLURRY NUMBER MIX WATER[1] | | | | | |
|---|---|---|---|---|---|---|
| | 33 | 34 | 35 | 36 | 37 | 38 |
| Polymer, % | 0 | 0.6 | 0 | 0.6 | 0 | 1.4 |
| Retarder, % | 0.15 | 0.15 | 0.375 | 0.375 | 0.4[2] | 0.4[2] |
| Temp deg F. | 140 | 140 | 200 | 200 | 250 | 250 |
| Thickening Time, HRS:MIN | | 4:45 | | 4:20 | | 4:19 |
| Zero Gel Time, HRS:MIN | 0:53 | 9:05 | 0:47 | 7:13 | 1:07 | 4:01 |
| Transition Time, HRS:MIN | 3:33 | 0:05 | 0:14 | 1:05 | 1:02 | 1:07 |
| Comp Strength HRS:MIN | | | | | | |
| 50 psi | 8:10 | 9:39 | 7:46 | 10:26 | 5:45 | 6:47 |
| 500 psi | 9:35 | 10:51 | 8:27 | 11:18 | 6:31 | 7:44 |
| 24 hours PSI | 2591 | 2786 | 3175 | 2660 | 2090 | 1439 |

Footnotes Table 6:
[1]-Slurries 33, 34, 35 and 36 were made using 40 percent mix water and slurries 37 and 38 were made using 55 percent mix water.
[2]-0.2% sodium lignosulfonate and 0.2% tartaric acid.

What is claimed is:

1. A method of cementing a borehole which penetrates a subterranean formation said method being comprised of the steps of:

forming a cement composition comprised of hydraulic cement in water;

placing said cement composition in said borehole adjacent said formation;

permitting said cement composition to set in said borehole whereby a hardened mass of cement is produced;

wherein said cement composition is comprised of water, hydraulic cement and an additive, said additive being comprised of a copolymer or a terpolymer polymerization product of a first vinyl-containing monomer with one or two other different vinyl-containing monomers selected from a second vinyl-containing monomer, a third vinyl-containing monomer and a fourth vinyl-containing monomer, wherein said first vinyl-containing monomer is a vinylamide morpholine derivative, said second vinyl-containing monomer is a vinylamide derivative, said third vinyl-containing monomer is an N-vinyl,2-ketoheterocyclic derivative and said fourth vinyl-containing monomer is a vinylacid derivative; and further wherein said vinylamide morpholine derivative is selected from compounds represented by the general formula

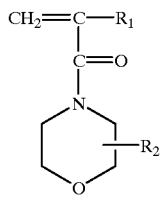

wherein $R_1$ is —H or —$CH_3$ and $R_2$ is —$CH_3$ or —$CH_2CH_3$ and is positioned on any one of the four carbons in the ring;

said vinylamide derivative is selected from compounds represented by the general formula

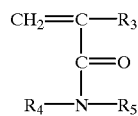

wherein $R_3$ is —H or —$CH_3$, $R_5$ is —H, —$CH_3$ or —$CH_2CH_3$, and $R_4$ is —H, —$CH_3$, —$CH_2CH_3$, —CH$(CH_3)_2$, —$C(CH_3)_3$ or —$C(CH_3)_2CH_2SO_3X$ and X is —H, —Na, —$NH_4$ or —Ca½;

said N-vinyl,2-ketoheterocyclic derivative is selected from compounds represented by the general formula

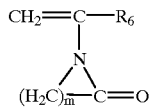

wherein $R_6$ is —H or —$CH_3$, and m has a value in the range of 3 to 6; and said vinylacid derivative is selected from compounds represented by the general formula

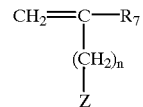

wherein $R_7$ is —H or —$CH_3$, Z is —$PO_3Y_2$, —$SO_3Y$ or —$CO_2Y$, Y is —H, —Na or —Ca½ and n has a value in the range of from about 0 to about 3.

2. The method of claim 1 wherein said additive is present in said cement composition in an amount in the range of from about 0.1 to about 1.5 percent additive by weight of hydraulic cement in said composition.

3. The method of claim 2 wherein said polymerization product is a terpolymer comprising said first vinyl-containing monomer, a compound selected from the group consisting of said second vinyl-containing monomer and said third vinyl-containing monomer and said fourth vinyl-containing monomer.

4. The method of claim 2 wherein the mole ratio of said vinylamide derivative, said N-vinyl,2-ketoheterocyclic derivative and mixtures thereof to said vinylamide morpholine derivative in said polymerization product is an amount in the range of from about 0 to about 4.5 moles per mole of said vinylamide morpholine derivative and the mole ratio of said vinylacid derivative to said vinylamide morpholine derivative in said polymerization product is an amount in the range of from about 0 to about 4.5 moles per mole of said vinylamide morpholine derivative.

5. The method of claim 3 wherein the mole ratio of said compound selected from the group consisting of said second vinyl-containing monomer and said third vinyl-containing monomer to said first vinyl-containing monomer in said polymerization product is an amount in the range of from about 0.5 to about 4.5 moles of said compound per mole of said first vinyl-containing monomer and the mole ratio of said fourth vinyl-containing monomer to said first vinyl-containing monomer in said polymerization product is an amount up to about 0.55 moles of said fourth vinyl-containing monomer per mole of said first vinyl-containing monomer.

6. The method of claim 4 wherein polymerization product is a copolymer, said vinylamide morpholine derivative is acryloylmorpholine and said vinylamide derivative is 2-acrylamido-2-methylpropanesulfonic acid.

7. The method of claim 5 wherein said vinylamide morpholine derivative is acryloylmorpholine, said vinylamide derivative is 2-acrylamido-2-methylpropanesulfonic acid and said vinylacid derivative is vinylphosphonic acid.

8. The method of claim 5 wherein said vinylamide morpholine derivative is acryloylmorpholine, said N-vinyl,2-ketoheterocyclic derivative is N-vinyl pyrrolidone and said vinylacid derivative is vinylphosphonic acid.

* * * * *